United States Patent
Suzuki et al.

(10) Patent No.: US 9,466,423 B2
(45) Date of Patent: Oct. 11, 2016

(54) LAMINATED CERAMIC CAPACITOR AND METHOD FOR MANUFACTURING LAMINATED CERAMIC CAPACITOR

(71) Applicant: MURATA MANUFACTURING CO., LTD.

(72) Inventors: Shoichiro Suzuki, Nagaokakyo (JP); Shinichi Yamaguchi, Nagaokakyo (JP)

(73) Assignee: MURATA MANUFACTURING CO., LTD., Nagaokakyo-Shi, Kyoto-Fu (JP)

(*) Notice: Subject to any disclaimer, the term of this patent is extended or adjusted under 35 U.S.C. 154(b) by 115 days.

(21) Appl. No.: 14/612,505

(22) Filed: Feb. 3, 2015

(65) Prior Publication Data

US 2015/0170838 A1    Jun. 18, 2015

Related U.S. Application Data

(63) Continuation of application No. PCT/JP2013/067350, filed on Jun. 25, 2013.

(30) Foreign Application Priority Data

Aug. 7, 2012 (JP) .................................. 2012-175049

(51) Int. Cl.
| | |
|---|---|
| *H01G 4/00* | (2006.01) |
| *H01G 4/008* | (2006.01) |
| *H01G 4/30* | (2006.01) |
| *H01G 4/232* | (2006.01) |

(52) U.S. Cl.
CPC .............. *H01G 4/008* (2013.01); *H01G 4/232* (2013.01); *H01G 4/30* (2013.01); *Y10T 29/417* (2015.01)

(58) Field of Classification Search
CPC ........ H01G 4/30; H01G 4/012; H01G 4/005; H01G 4/008; H01G 4/0085; H01G 4/01
See application file for complete search history.

(56) References Cited

U.S. PATENT DOCUMENTS

| | | | |
|---|---|---|---|
| 6,917,513 B1 | 7/2005 | Kim et al. | |
| 2006/0254693 A1* | 11/2006 | Murosawa | B32B 18/00 156/89.14 |
| 2008/0055818 A1 | 3/2008 | Celik et al. | |

(Continued)

FOREIGN PATENT DOCUMENTS

| | | |
|---|---|---|
| JP | 5-290622 A | 11/1993 |
| JP | H11-87588 A | 3/1999 |

(Continued)

OTHER PUBLICATIONS

Nash et al; "The Ni—Sn (Nickel—Tin) System"; Bulletin of Alloy Phase Diagrams, vol. 6, No. 4, 1985, pp. 350-359.

(Continued)

*Primary Examiner* — Dion R Ferguson
(74) *Attorney, Agent, or Firm* — Arent Fox LLP

(57) ABSTRACT

A laminated ceramic capacitor that includes a ceramic laminated body of a plurality of stacked ceramic dielectric layers, a plurality of internal electrodes opposed to each other with the ceramic dielectric layers interposed therebetween within the ceramic laminated body, and external electrodes provided on the outer surface of the ceramic laminated body and electrically connected to the internal electrodes. The internal electrodes contain Ni as a main constituent, and the Ni constituting the internal electrodes has a lattice constant in the range of 0.3250 nm to 0.3450 nm.

14 Claims, 4 Drawing Sheets

(56) References Cited

U.S. PATENT DOCUMENTS

| | | | |
|---|---|---|---|
| 2009/0067117 A1* | 3/2009 | Kasuya | H01G 4/005 361/321.2 |
| 2009/0207551 A1 | 8/2009 | Suzuki | |
| 2013/0049532 A1* | 2/2013 | Kim | H01G 4/0085 310/311 |
| 2013/0286539 A1* | 10/2013 | Kim | H01G 4/01 361/303 |
| 2013/0321980 A1 | 12/2013 | Suzuki et al. | |
| 2013/0329334 A1* | 12/2013 | Hiramatsu | H01G 4/12 361/272 |
| 2014/0240898 A1* | 8/2014 | Kim | H01G 4/30 361/303 |
| 2014/0376150 A1* | 12/2014 | Kim | H01G 4/30 361/301.4 |

FOREIGN PATENT DOCUMENTS

| | | |
|---|---|---|
| JP | 11-283867 | 10/1999 |
| JP | 2000-348962 A | 12/2000 |
| JP | 2005-298315 A | 10/2005 |
| JP | 2008-248335 A | 10/2008 |
| JP | 2011-198874 A | 10/2011 |
| KR | 2004-0079251 A | 9/2004 |
| KR | 10-050687 B1 | 6/2005 |
| WO | WO-2008-068999 A1 | 6/2008 |
| WO | WO-2012/111592 A1 | 8/2012 |

OTHER PUBLICATIONS

PCT/JP2013/067350 Written Opinion dated Jul. 18, 2013.
PCT/JP2013/067350 ISR dated Jul. 18, 2013.

* cited by examiner

LAMINATED CERAMIC CAPACITOR AND METHOD FOR MANUFACTURING LAMINATED CERAMIC CAPACITOR

CROSS REFERENCE TO RELATED APPLICATIONS

The present application is a continuation of International application No. PCT/JP2013/067350, filed Jun. 25, 2013, which claims priority to Japanese Patent Application No. 2012-175049, filed Aug. 7, 2012, the entire contents of each of which are incorporated herein by reference.

FIELD OF THE INVENTION

The present invention relates to a laminated ceramic capacitor, and a method for manufacturing a laminated ceramic capacitor.

BACKGROUND OF THE INVENTION

With the progress of recent electronics technology, the reduction in size and the increase in capacitance have been required for laminated ceramic capacitors. In order to satisfy these requirements, the reduction in layer thickness has been advanced for ceramic dielectric layers constituting laminated ceramic capacitors. However, the reduction of the ceramic dielectric layers in layer thickness relatively increases the electric field intensity applied per layer. Therefore, improved durability and reliability at the time of voltage application are required.

As the laminated ceramic capacitors, for example, a laminated ceramic capacitor is known which includes: a laminated body including a plurality of ceramic dielectric layers stacked and a plurality of internal electrodes formed along the interfaces between the ceramic dielectric layers; and a plurality of external electrodes formed on the outer surface of the laminated body and electrically connected to the internal electrodes (see Patent Document 1). Further, in the case of the laminated ceramic capacitor in Patent Document 1, electrodes which use Ni as their main constituent are disclosed as the internal electrodes.

Patent Document 1: Japanese Patent Application Laid-Open No. 11-283867

SUMMARY OF THE INVENTION

However, the laminated ceramic capacitor including the internal electrodes using Ni as a main constituent in Patent Document 1 has the problem of still insufficient durability in a high-temperature load test, for meeting the recent requirements of reduction in size and increase in capacitance.

The present invention has been achieved in order to solve the problem mentioned above, and an object of the present invention is to provide a highly reliable laminated ceramic capacitor which exhibits excellent durability in a high-temperature load test, even when ceramic dielectric layers are further reduced in layer thickness.

In order to solve the problem mentioned above, a laminated ceramic capacitor according to the present invention is:

a laminated ceramic capacitor including: a ceramic laminated body of a plurality of ceramic dielectric layers stacked; a plurality of internal electrodes provided to be opposed to each other with the ceramic dielectric layers interposed therebetween within the ceramic laminated body; and an external electrode provided on the outer surface of the ceramic laminated body to be electrically connected to the internal electrodes, and characterized in that:

the internal electrodes contain Ni as a main constituent; and the Ni constituting the internal electrodes has a lattice constant in the range of 0.3250 nm to 0.3450 nm.

In addition, in the laminated ceramic capacitor according to the present invention, the internal electrodes containing Ni as a main constituent preferably contain Sn.

The internal electrodes containing Ni as a main constituent and further containing Sn allows the lattice constant of the Ni constituting the internal electrodes to fall within the range of 0.3250 nm to 0.3450 nm with great efficiency, and moreover with certainty, thereby making the present invention more effective.

Furthermore, a method for manufacturing a first laminated ceramic capacitor according to the present invention is:

a method for manufacturing a laminated ceramic capacitor including: a ceramic laminated body of a plurality of ceramic dielectric layers stacked; a plurality of internal electrodes provided to be opposed to each other with the ceramic dielectric layers interposed therebetween within the ceramic laminated body; and an external electrode provided on the outer surface of the ceramic laminated body to be electrically connected to the internal electrodes, where the internal electrodes contain Ni as a main constituent, and contain Sn; and the Ni constituting the internal electrodes has a lattice constant in the range of 0.3250 nm to 0.3450 nm, and characterized in that the method includes the steps of:

forming an unfired ceramic laminated body including a plurality of unfired ceramic dielectric layers stacked, which include a ceramic raw material containing Sn, and a plurality of unfired internal electrode patterns provided to be opposed to each other with the unfired ceramic dielectric layers interposed therebetween, which include a conductive paste film containing Ni as a main constituent; and firing the unfired ceramic laminated body to obtain a ceramic laminated body including a plurality of ceramic dielectric layers, and a plurality of internal electrodes provided to be opposed to each other with the ceramic dielectric layers interposed therebetween.

Furthermore, a method for manufacturing a second laminated ceramic capacitor according to the present invention is:

a method for manufacturing a laminated ceramic capacitor including: a ceramic laminated body of a plurality of ceramic dielectric layers stacked; a plurality of internal electrodes provided to be opposed to each other with the ceramic dielectric layers interposed therebetween within the ceramic laminated body; and an external electrode provided on the outer surface of the ceramic laminated body to be electrically connected to the internal electrodes, where the internal electrodes contain Ni as a main constituent, and contain Sn; and the Ni constituting the internal electrodes has a lattice constant in the range of 0.3250 nm to 0.3450 nm, and characterized in that the method includes the steps of:

forming an unfired ceramic laminated body including a plurality of unfired ceramic dielectric layers stacked, and a plurality of unfired internal electrode patterns provided to be opposed to each other with the unfired ceramic dielectric layers interposed therebetween, which include a conductive paste film containing Ni as a main constituent and containing Sn; and firing the unfired ceramic laminated body to obtain a ceramic laminated body including a plurality of ceramic dielectric layers, and a plurality of internal electrodes provided to be opposed to each other with the ceramic dielectric layers interposed therebetween.

The laminated ceramic capacitor according to the present invention is configured so that the internal electrodes contain Ni as a main constituent, and the Ni constituting the internal electrodes has a lattice constant in the range of 0.3250 nm to 0.3450 nm as described above (it is to be noted that the Ni constituting internal electrodes typically has a lattice constant less than 0.3250 nm). Further, the Ni lattice constant controlled in the range mentioned above makes it possible to promote the ionization of electrons from the internal electrodes, thereby changing the barriers at internal electrode interfaces. As a result, it becomes possible to achieve a highly reliable laminated ceramic capacitor which has excellent durability in a high-temperature load test.

However, the excessively increased Ni lattice constant makes it impossible for the Ni to keep the single phase, thereby decreasing the reliability. Thus, the lattice constant of the Ni constituting the internal electrodes is defined in the range of 0.3250 nm to 0.3450 nm in the present invention.

Furthermore, the method for manufacturing a first laminated ceramic capacitor according to the present invention is adapted to form an unfired ceramic laminated body including the plurality of unfired ceramic dielectric layers including a ceramic raw material containing Sn, and the unfired internal electrode patterns including the conductive paste film containing Ni as a main constituent; and fire the unfired ceramic laminated body to obtain a ceramic laminated body including a plurality of ceramic dielectric layers, and a plurality of internal electrodes provided to be opposed to each other with the ceramic dielectric layers interposed therebetween. Thus, Sn is supplied from the ceramic dielectric layer side to the internal electrode side to increase the Ni lattice constant. As a result, a highly reliable laminated ceramic capacitor including internal electrodes with a Ni lattice constant in the range of 0.3250 nm to 0.3450 nm, which is excellent in durability in a high-temperature load test, can be manufactured with great efficiency, and moreover with certainty.

More specifically, the supply of Sn from the ceramic dielectric layer side to the internal electrode side for the achievement of a solid solution of Sn in the Ni constituting the internal electrodes makes it possible to increase the Ni lattice constant. As a result, the ionization of electrons from the internal electrodes is promoted to change the barriers at the interfaces of the internal electrodes. Further, the changed barriers at the interfaces of the internal electrodes make it possible to achieve a highly reliable laminated ceramic capacitor which is excellent in high-temperature load life.

Furthermore, the method for manufacturing a second laminated ceramic capacitor according to the present invention is adapted to form the unfired ceramic laminated body including the plurality of unfired ceramic dielectric layers stacked, and the unfired internal electrode patterns including the conductive paste film containing Ni as a main constituent and containing Sn; and fire the unfired ceramic laminated body to obtain a ceramic laminated body including a plurality of ceramic dielectric layers, and a plurality of internal electrodes provided to be opposed to each other with the ceramic dielectric layers interposed therebetween. Thus, as the internal electrodes, internal electrodes containing Ni as a main constituent and containing Sn are formed with certainty, regardless of the kind of material constituting the ceramic dielectric layers. Therefore, a highly reliable laminated ceramic capacitor which is excellent in durability in a high-temperature load test can be manufactured with great efficiency, in which Ni constituting internal electrodes has a lattice constant in the range of 0.3250 nm to 0.3450 nm.

DETAILED DESCRIPTION OF THE INVENTION

With reference to embodiments of the present invention, features of the present invention will be described below in details.

Embodiment 1

Configuration of Laminated Ceramic Capacitor

Figure 1:
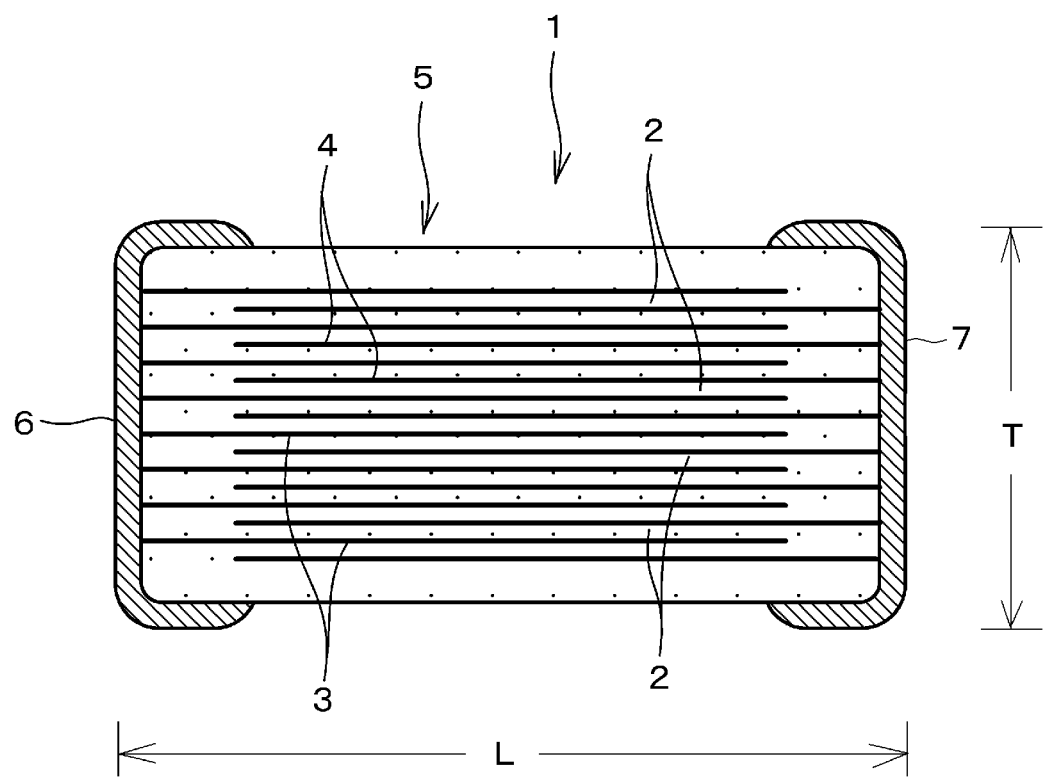
FIG. 1 is a front cross-sectional view illustrating the configuration of a laminated ceramic capacitor according to an embodiment of the present invention.

FIG. 1 is a front cross-sectional view illustrating the configuration of a laminated ceramic capacitor according to an embodiment of the present invention.

This laminated ceramic capacitor 1 includes a ceramic laminated body 5. The ceramic laminated body 5 includes a plurality of ceramic dielectric layers 2 stacked, and a plurality of internal electrodes 3 and 4 provided therein to be opposed to each other with the ceramic dielectric layers 2 interposed therebetween. It is to be noted that the internal electrodes 3 and 4 provided in the ceramic dielectric layers 2 are alternately extracted to opposite end surfaces of the ceramic laminated body 5.

Further, on the end surfaces of the ceramic laminated body 5, which are opposed to each other, external electrodes 6 and 7 are provided so as to be electrically connected to the internal electrodes 3 and 4.

Materials containing, for example, Ag or Cu as their main constituent can be used as the conductive material constituting the external electrodes 6 and 7.

It is to be noted that while this laminated ceramic capacitor 1 according to this embodiment is a two-terminal type capacitor including the two external electrodes 6 and 7, the present invention can be also applied to multi-terminal type capacitors including a number of external electrodes.

In this laminated ceramic capacitor 1, the internal electrodes 3 and 4 are electrodes containing Ni as their main constituent, and containing Sn.

Furthermore, the laminated ceramic capacitor according to this embodiment is configured so that the lattice constant of Ni constituting the internal electrodes 3 and 4 is 0.3250 nm to 0.3450 nm.

The laminated ceramic capacitor according to this embodiment makes it possible to promote the ionization of electrons from the internal electrodes, thereby changing the barriers at internal electrode interfaces, because the lattice constant of Ni constituting the internal electrodes 3 and 4 is 0.3250 nm to 0.3450 nm. As a result, a highly reliable laminated ceramic capacitor can be provided which has excellent durability in a high-temperature load test.

<Manufacture of Laminated Ceramic Capacitor>

Next, a method for manufacturing the laminated ceramic capacitor 1 according to the above-described embodiment of the present invention will be described.

(1) First, predetermined amounts of $BaCO_3$ powder and $TiO_2$ powder were weighed as raw materials for a perovskite compound containing Ti and Ba. Then, the weighed powders were combined, mixed with a ball mill, and then subjected to heat treatment under a predetermined condition to obtain a barium titanate-based perovskite compound powder to serve as a main constituent of the material constituting the ceramic dielectric layers.

(2) Next, respective powders of $Dy_2O_3$, MgO, MnO, $SiO_2$, and $SnO_2$ were prepared as accessory constituents, and these powders were blended into the barium titanate-based perovskite compound powder as a main constituent so as to provide proportions as shown in Table 1. Then, the blended powders were mixed for a given length of time, dried, and then subjected to dry grinding to obtain a raw material powder (ceramic raw material powder).

(3) Next, this raw material powder with a polyvinyl butyral-based binder and an organic solvent such as ethanol added thereto was mixed in a wet way with a ball mill to adjust ceramic slurry. This ceramic slurry was subjected to sheet forming in accordance with a doctor blade method, thereby providing ceramic green sheets of 0.9 μm in thickness.

(4) Next, a Ni powder as a conductive component was, through the addition of a polyvinyl butyral-based binder and an organic solvent such as ethanol thereto, mixed in a wet way with a ball mill to prepare a conductive paste for the formation of internal electrodes.

(5) Then, this conductive paste containing the Ni powder as a conductive component was printed in a predetermined pattern onto the ceramic green sheets prepared in the way described above to form conductive paste layers (internal electrode patterns) to serve as internal electrodes after being subjected to firing.

(6) Then, a plurality of ceramic green sheets were stacked so that the internal electrode patterns described above were alternately extracted to the opposite sides, thereby providing an unfired ceramic laminated body.

(7) This ceramic laminated body was heated to 350° C. in a $N_2$ atmosphere to burn the binder, and subjected to firing at 1150° C. for 20 minutes after increasing the temperature at a rate of temperature increase of 20° C./min in a reducing atmosphere of $H_2$—$N_2$—$H_2O$ gas with an oxygen partial pressure of $10^{-10}$ to $10^{-12}$ MPa, thereby obtaining a fired ceramic laminated body.

(8) Next, a conductive paste for the formation of external electrodes, containing Ag as a conductive component and containing a $B_2O_3$—$SiO_2$—BaO-based glass frit, was applied to both end surfaces of the obtained ceramic laminated body, baked at a temperature of 600° C. in a $N_2$ atmosphere to form external electrodes electrically connected to internal electrodes.

In this way, laminated ceramic capacitors (samples of sample numbers 1 to 8 in Table 1) 1 structured as shown in FIG. 1 were obtained.

It is to be noted that the samples of sample numbers 1 and 8 marked with * in Table 1 are samples according to comparative examples, which fail to meet the requirements of the present invention, whereas the samples of sample numbers 2 to 7 marked with no * therein are samples according to examples, which meet the requirements of the present invention.

The outside dimensions of the laminated capacitors obtained in this embodiment were: width (W): 1.0 mm; length (L): 2.0 mm; and thickness (T): 1.0 mm, and the ceramic dielectric layer interposed between the internal electrodes was 0.6 μm in thickness. In addition, the total number of effective ceramic dielectric layers interposed between the internal electrodes was 100, and the area of the electrode opposed per layer was $1.7 \times 10^{-6}$ $m^2$.

<Evaluation of Characteristics>

For each of the laminated ceramic capacitors (samples of sample numbers 1 to 8 in Table 1) prepared in the way described above, a high-temperature load test was carried out by the method described below to examine the characteristics, and the lattice constant was checked on Ni constituting the internal electrodes.

(1) High-Temperature Load Test

From the samples of sample numbers 1 to 8, ten pieces of samples were taken for each sample number, and subjected to a high-temperature load test under the condition of 10 V at 150° C., and a failure was determined at the time of an insulation resistance down to 10 KΩ) or less. From this failure period, the MTTF (mean time to failure) was calculated. The results are shown together in Table 1.

(2) Measurement of Lattice Constant of Ni Constituting Internal Electrode

Furthermore, a 2 g of test sample of each of the samples (laminated ceramic capacitors) described above was prepared that is obtained by removing the external electrodes and outermost ceramic dielectric layers (outer layer section), and subjected to grinding with the use of a mortar. The powders were analyzed by powder XRD diffraction to extract only the peak for Ni, and the Ni lattice constants were calculated through Rietveld analysis. The calculated lattice constants are shown together in Table 1.

TABLE 1

| Sample Number | Composition of Main Constituent | $Dy_2O_3$ (mol %) | MgO (mol %) | MnO (mol %) | $SiO_2$ (mol %) | $SnO_2$ (mol %) | Lattice Constant of Ni (nm) | MTTF (h) |
|---|---|---|---|---|---|---|---|---|
| 1* | $BaTiO_3$ | 0.5 | 1 | 0.2 | 1 | 0.0 | 0.3248 | 5 |
| 2 | $BaTiO_3$ | 0.5 | 1 | 0.2 | 1 | 0.1 | 0.3253 | 21 |
| 3 | $BaTiO_3$ | 0.5 | 1 | 0.2 | 1 | 0.7 | 0.3283 | 26 |
| 4 | $BaTiO_3$ | 0.5 | 1 | 0.2 | 1 | 1.0 | 0.3298 | 30 |
| 5 | $BaTiO_3$ | 0.5 | 1 | 0.2 | 1 | 1.5 | 0.3323 | 35 |
| 6 | $BaTiO_3$ | 0.5 | 1 | 0.2 | 1 | 2.0 | 0.3348 | 26 |
| 7 | $BaTiO_3$ | 0.5 | 1 | 0.2 | 1 | 4.0 | 0.3448 | 21 |
| 8* | $BaTiO_3$ | 0.5 | 1 | 0.2 | 1 | 5.0 | 0.3501 | 9 |

As shown in Table 1, a correlation is revealed between the Ni lattice constant and reliability. More specifically, it has been confirmed that the samples of sample numbers 2 to 7 with the Ni lattice constant in the range of 0.3250 nm to 0.3450 nm have MTTF from 21 to 35 h, and have improvements in durability in the high-temperature load test, as compared with the sample of sample number 1 (Ni lattice constant: 0.3248 nm) having MTTF: 5 h and the sample of sample number 8 (Ni lattice constant: 0.3501 nm) having MTTF: 9 h that fail to meet the requirements of the present invention.

<Confirmation of Presence and Distribution of Sn in Internal Electrode>

Furthermore, the fired ceramic laminated body obtained in the step (7) mentioned above for manufacturing the laminated ceramic capacitor was used to confirm the presence of Sn in the internal electrodes, and the distribution of Sn in the internal electrodes by the method described below.

Each sample was held in such a posture as the length (L) direction in a vertical direction, the sample was encased in resin, and the WT surface defined by the width (W) and thickness (T) of the sample was exposed from the resin.

Then, the WT surfaces of the respective samples were polished by a polishing machine, and polished to a depth on the order of ½ in the length (L) directions of the respective samples. Then, in order to eliminate shear drop of the internal electrodes, which is caused by the polishing, the polished surfaces were processed by ion milling after the completion of the polishing.

Figure 2:
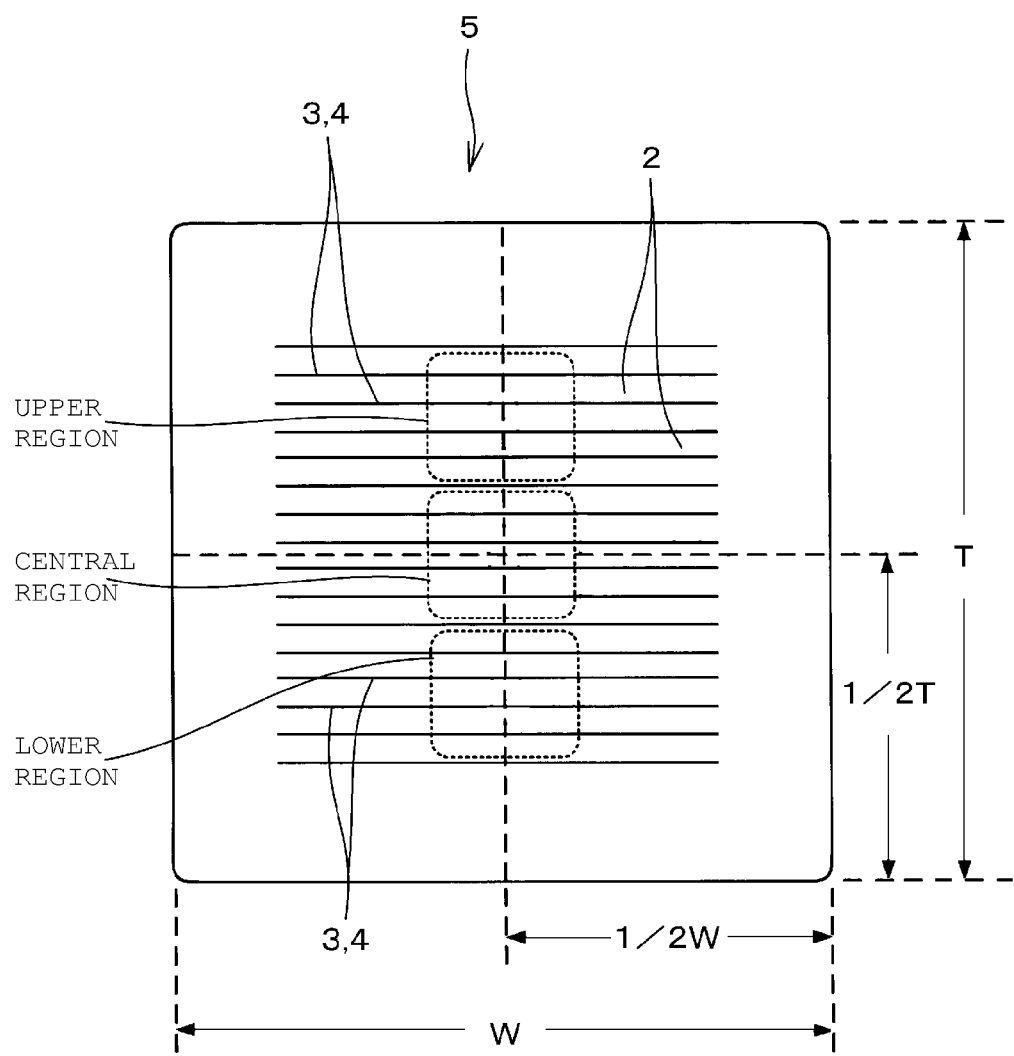
FIG. 2 is an explanatory diagram illustrating points for Ni and Sn mapping analyses performed by WDX on internal electrodes constituting the laminated ceramic capacitor according to the embodiment of the present invention.

Then, as shown in FIG. 2, in a position of the WT cross section on the order of ½ in the L direction, a region of the sample with the internal electrodes stacked was divided into three equal parts in the T direction, i.e., three regions of: an upper region; a central region; and a lower region. Then, the respective regions were subjected to Ni and Sn mapping analyses by WDX (wavelength-dispersive X-ray spectroscopy).

Figure 3:
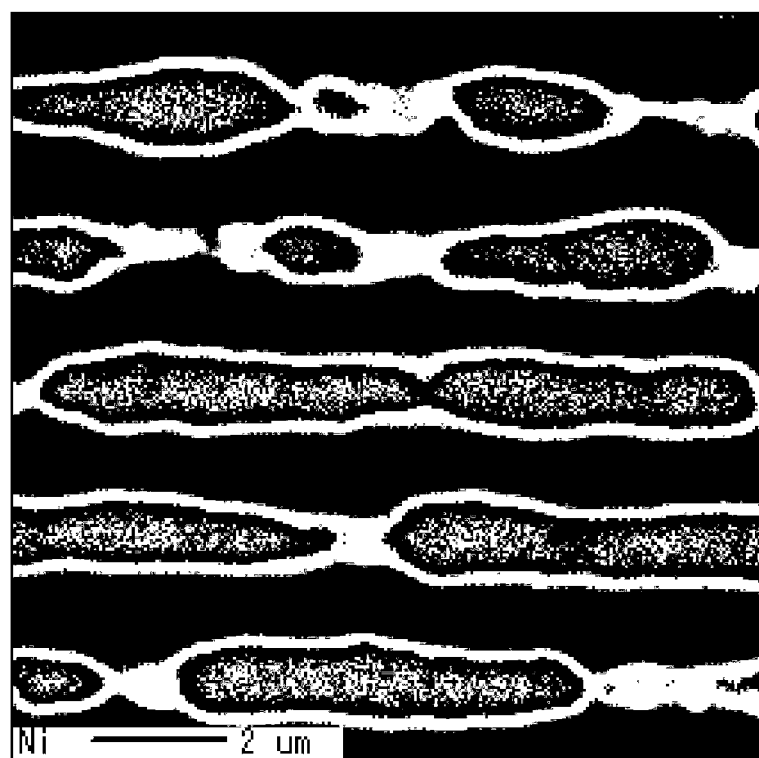
FIG. 3 is a diagram showing the result of Ni mapping analysis performed by WDX on the internal electrodes constituting the laminated ceramic capacitor according to the embodiment of the present invention.
Figure 4:
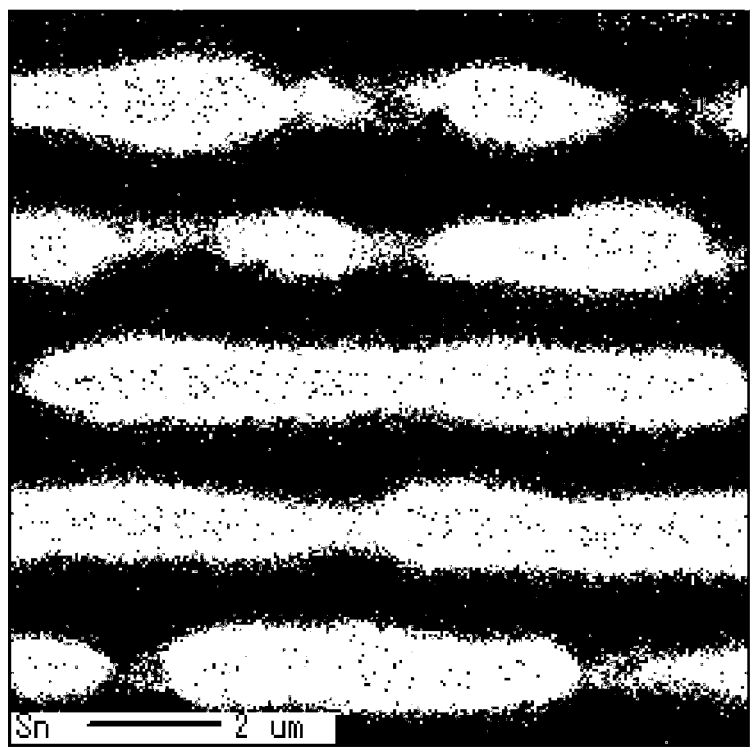
FIG. 4 is a diagram showing the result of Sn mapping analysis performed by WDX on the internal electrodes constituting the laminated ceramic capacitor according to the embodiment of the present invention.

FIGS. 3 and 4 show the results of the Ni and Sn mapping analyses, respectively, carried out for the samples of sample number 3 (the sample according to the example which meets the requirements of the present invention).

From FIGS. 3 and 4, it has been confirmed that there is Sn in the internal electrodes in the sample of sample number 3 (the laminated ceramic capacitor according to the embodiment of the present invention) with the internal electrodes formed with the use of the conductive paste blended with the common material containing the Sn constituent.

Further, it has been confirmed, as a result of the mapping analyses, that there is also Sn in the internal electrodes in the samples (sample numbers 2 and 4 to 8) other than the sample of sample number 3. However, the presence of Sn in the internal electrodes has not been confirmed in the case of the sample of sample number 1 without Sn contained in any of the ceramic raw material and conductive paste for the formation of internal electrodes.

From the results mentioned above, it has been confirmed that an appropriate amount of Sn contained in Ni (as a solid solution) constituting the internal electrodes makes it possible to control the Ni lattice constant in the range of 0.3250 nm to 0.3450 nm, thereby improving durability in a high-temperature load test.

This is believed to be due to that the increased lattice constant of the Ni constituting the internal electrodes promotes the ionization of electrons from the internal electrodes to change the barriers at internal electrode interfaces. However, as in the sample of sample number 8, the excessively increased Ni lattice constant (the lattice constant in excess of 0.3450 nm) makes it impossible for the Ni to keep the single phase, thereby decreasing the durability in a high-temperature load test.

Therefore, in the present invention, it is desirable to control the lattice constant in the range of 0.3250 nm to 0.3450 nm.

Embodiment 2

In this Embodiment 2, a laminated ceramic capacitor configured as is the case in Embodiment 1 described above was prepared by the method described below.

<Manufacture of Laminated Ceramic Capacitor>

(1) First, predetermined amounts of $BaCO_3$ powder and $TiO_2$ powder were weighed as raw materials for a perovskite compound containing Ti and Ba. Then, the weighed powders were combined, mixed with a ball mill, and then subjected to heat treatment under a predetermined condition to obtain a barium titanate-based perovskite compound powder to serve as a main constituent of the material constituting the ceramic dielectric layers.

(2) Next, respective powders of $Dy_2O_2$, MgO, MnO, and $SiO_2$ were prepared as accessory constituents, and these powders were blended into the barium titanate-based perovskite compound powder as a main constituent so as to provide proportions as shown in Table 2. Then, the blended powders were mixed for a given length of time, dried, and then subjected to dry grinding to obtain a raw material powder (ceramic raw material powder).

(3) Next, this raw material powder with a polyvinyl butyral-based binder and an organic solvent such as ethanol added thereto was mixed in a wet way with a ball mill to adjust slurry. This ceramic slurry was subjected to sheet forming in accordance with a doctor blade method, thereby providing ceramic green sheets of 1.5 μm in thickness.

(4) Next, the Ni—Sn alloy powder containing Sn in the proportion as shown in Table 2 was, through the addition of a polyvinyl butyral-based binder and an organic solvent such as ethanol thereto, mixed in a wet way with a ball mill to prepare a conductive paste for the formation of internal electrodes.

(5) Then, this conductive paste containing the Ni—Sn alloy powder as a conductive component was printed in a predetermined pattern onto the ceramic green sheets prepared in the way described above to form conductive paste layers (internal electrode patterns) to serve as internal electrodes after being subjected to firing.

(6) Then, a plurality of ceramic green sheets were stacked so that the internal electrode patterns described above were alternately extracted to the opposite sides, thereby providing an unfired ceramic laminated body.

(7) This ceramic laminated body was heated to 350° C. in a $N_2$ atmosphere to burn the binder, and subjected to firing at 1200° C. for 20 minutes after increasing the temperature at a rate of temperature increase of 20° C./min in a reducing atmosphere of $H_2$—$N_2$—$H_2O$ gas with an oxygen partial pressure of $10^{-10}$ to $10^{-12}$ MPa, thereby obtaining a fired ceramic laminated body.

(8) Next, a conductive paste for the formation of external electrodes, containing Ag as a conductive component and containing a $B_2O_3$—$SiO_2$—BaO-based glass frit, was applied to both end surfaces of the obtained ceramic laminated body, baked at a temperature of 600° C. in a $N_2$ atmosphere to form external electrodes electrically connected to internal electrodes. In this way, laminated ceramic capacitors (samples of sample numbers 9 to 15 in Table 2) 1 structured as shown in FIG. 1 were obtained.

It is to be noted that the samples of sample numbers 9 and 15 marked with * in Table 2 are samples according to comparative examples, which fail to meet the requirements of the present invention, whereas the samples of sample numbers 10 to 14 marked with no * therein are samples according to examples, which meet the requirements of the present invention.

The outside dimensions of the laminated capacitors obtained in this embodiment were: width (W): 1.0 mm; length (L): 2.0 mm; and thickness (T): 1.0 mm, and the ceramic dielectric layer interposed between the internal electrodes was 1.0 μm in thickness. In addition, the total number of effective ceramic dielectric layers interposed between the internal electrodes was 230, and the area of the electrode opposed per layer was $1.7 \times 10^{-6}$ m$^2$.

<Evaluation of Characteristics>

For each of the laminated ceramic capacitors (samples of sample numbers 9 to 15 in Table 2) prepared in the way described above, a high-temperature load test was carried out by the method described below to examine the characteristics, and the lattice constant was checked on Ni constituting the internal electrodes.

High-Temperature Load Test

From the samples of sample numbers 9 to 15, ten pieces of samples were taken for each sample number, and subjected to a high-temperature load test under the condition of 10 V at 150° C., and a failure was determined at the time of an insulation resistance down to 10 KΩ or less. From this failure period, the MTTF (mean time to failure) was calculated. The results are shown together in Table 2.

(2) Measurement of Lattice Constant of Ni Constituting Internal Electrode

Furthermore, a 2 g of test sample of each of the samples (laminated ceramic capacitors) of sample numbers 9 to 15 described above was prepared that is obtained by removing the external electrodes and outermost ceramic dielectric layers (outer layer section), and subjected to grinding with the use of a mortar. The powders were analyzed by powder XRD diffraction to extract only the peak for Ni, and the Ni lattice constants were calculated through Rietveld analysis. The calculated lattice constants are shown together in Table 2.

constant below 0.3250 nm as in the sample of sample number 9 results in an insufficient improvement in durability in the high-temperature load test, whereas the Ni lattice constant excessively increased (the lattice constant in excess of 0.3450 nm) as in the sample of sample number 15 makes it impossible for the Ni to keep the single phase, thereby decreasing the durability in the high-temperature load test.

Furthermore, Ni and Sn mapping analyses were carried out by WDX (wavelength-dispersive X-ray spectroscopy) in the same way as in the case of Embodiment 1 described above to confirm the presence of Sn in the internal electrodes also in the case of the laminated ceramic capacitor according to Embodiment 2 herein.

From the results in Embodiment 2 herein, also in the case of using, as the conductive paste for the formation of internal electrodes, the conductive paste containing the Ni—Sn alloy powder as a conductive component, the Ni and appropriate amount of Sn contained in the internal electrodes have made it possible to control the Ni lattice constant in the range of 0.3250 nm to 0.3450 nm, thereby succeeding in improving the durability in the high-temperature load test.

It is to be noted that while Sn in coexistence with the Ni constituting the internal electrodes controls the Ni lattice constant in the predetermined range to improve the durability in the high-temperature load test in Embodiments 1 and 2 described above, it is also possible for a constituent other than Sn to coexist therewith to control the Ni lattice constant in a predetermined range, thereby improving the durability in the high-temperature load test.

Furthermore, while the barium titanate-based perovskite-type compound is used as the perovskite-type compound constituting the ceramic dielectric layers in the embodiments described above, the kind of perovskite-type compound constituting the ceramic dielectric layers is not specially restricted in the laminated ceramic capacitor according to the present invention, but it is also possible to use other perovskite-type compounds.

The present invention is not to be considered limited to the embodiments described above in other respects, but various applications and modifications can be made within

TABLE 2

| Sample Number | Composition of Main Constituent | Dy$_2$O$_3$ (mol %) | MgO (mol %) | MnO (mol %) | SiO$_2$ (mol %) | Proportion of Sn (atm %) | Lattice Constant of Ni (nm) | MTTF (h) |
|---|---|---|---|---|---|---|---|---|
| 9* | BaTiO$_3$ | 0.5 | 1 | 0.2 | 1 | 0 | 0.3248 | 5 |
| 10 | BaTiO$_3$ | 0.5 | 1 | 0.2 | 1 | 0.3 | 0.3263 | 38 |
| 11 | BaTiO$_3$ | 0.5 | 1 | 0.2 | 1 | 0.5 | 0.3273 | 42 |
| 12 | BaTiO$_3$ | 0.5 | 1 | 0.2 | 1 | 1.0 | 0.3298 | 48 |
| 13 | BaTiO$_3$ | 0.5 | 1 | 0.2 | 1 | 1.5 | 0.3323 | 35 |
| 14 | BaTiO$_3$ | 0.5 | 1 | 0.2 | 1 | 2.3 | 0.3308 | 26 |
| 15* | BaTiO$_3$ | 0.5 | 1 | 0.2 | 1 | 4.0 | 0.3452 | 13 |

As shown in Table 2, a correlation is revealed between the Ni lattice constant and reliability. More specifically, it has been confirmed that in the cases of the samples of sample numbers 10 to 14 with the Ni lattice constant in the range of 0.3250 nm to 0.3450 nm, the MTTF ranges from 26 to 48 h, and the samples have improvements in durability in the high-temperature load test, as compared with the sample of sample number 9 (Ni lattice constant: 0.3248 nm) having MTTF: 5 h and the sample of sample number 15 (Ni lattice constant: 0.3452 nm) having MTTF: 13 h that fail to meet the requirements of the present invention.

It is to be noted that it is desirable to control the lattice constant of the Ni constituting the internal electrodes in the range of 0.3250 nm to 0.3450 nm, because the Ni lattice the scope of the invention in regard to the numbers of ceramic dielectric layers and internal electrodes constituting the laminated body, etc.

DESCRIPTION OF REFERENCE SYMBOLS 1 laminated ceramic capacitor
2 ceramic dielectric layer
3, 4 internal electrode
5 ceramic laminated body
6, 7 external electrode
L length
T thickness
W width

The invention claimed is:

1. A laminated ceramic capacitor comprising:
a ceramic laminated body having a plurality of stacked ceramic dielectric layers;
a plurality of internal electrodes opposed to each other with the ceramic dielectric layers interposed therebetween within the ceramic laminated body; and
an external electrode provided on an outer surface of the ceramic laminated body and electrically connected to the internal electrodes,
wherein the internal electrodes contain Ni as a main constituent, and
the Ni constituting the internal electrodes has a lattice constant in the range of 0.3250 nm to 0.3450 nm.

2. The laminated ceramic capacitor according to claim 1, wherein the internal electrodes further contain Sn.

3. The laminated ceramic capacitor according to claim 1, wherein the internal electrodes comprise a first set of internal electrodes extending out from a first end surface of the ceramic laminated body and a second set of internal electrodes extending out from a second end surface of the ceramic laminated body,
the external electrode is a first external electrode electrically connected to the first set of internal electrodes and
the laminated ceramic capacitor further includes a second external electrode electrically connected to the second set of internal electrodes.

4. A method for manufacturing a laminated ceramic capacitor, the method comprising:
forming an unfired ceramic laminated body comprising a plurality of stacked unfired ceramic dielectric layers, and a plurality of unfired internal electrode patterns opposed to each other with the unfired ceramic dielectric layers interposed therebetween, the unfired internal electrode patterns comprising a conductive paste film containing Ni as a main constituent; and
firing the unfired ceramic laminated body to obtain a ceramic laminated body including a plurality of ceramic dielectric layers, and a plurality of internal electrodes provided to be opposed to each other with the ceramic dielectric layers interposed therebetween,
wherein the Ni constituting the internal electrodes has a lattice constant in the range of 0.3250 nm to 0.3450 nm.

5. The method for manufacturing a laminated ceramic capacitor according to claim 4, further comprising forming an external electrode on an outer surface of the ceramic laminated body and electrically connected to the internal electrodes.

6. The method for manufacturing a laminated ceramic capacitor according to claim 4, wherein the internal electrodes further contain Sn.

7. The method for manufacturing a laminated ceramic capacitor according to claim 5,
wherein the internal electrodes comprise a first set of internal electrodes extending out from a first end surface of the ceramic laminated body and a second set of internal electrodes extending out from a second end surface of the ceramic laminated body,
the external electrode is a first external electrode electrically connected to the first set of internal electrodes and
the method further comprises forming a second external electrode electrically connected to the second set of internal electrodes.

8. The method for manufacturing a laminated ceramic capacitor according to claim 4, wherein the unfired ceramic dielectric layers comprise a ceramic raw material containing Sn.

9. The method for manufacturing a laminated ceramic capacitor according to claim 8, wherein the internal electrodes further contain Sn.

10. The method for manufacturing a laminated ceramic capacitor according to claim 4, wherein the firing is conducted at a temperature of 1150° C. for 20 minutes with a rate of temperature increase of 20° C./min.

11. The method for manufacturing a laminated ceramic capacitor according to claim 10, wherein the firing is conducted in a reducing atmosphere.

12. The method for manufacturing a laminated ceramic capacitor according to claim 11, wherein the reducing atmosphere is $H_2$—$N_2$—$H_2O$ gas with an oxygen partial pressure of $10^{-10}$ to $10^{-12}$ Mpa.

13. A method for manufacturing a laminated ceramic capacitor comprising: a ceramic laminated body of a plurality of stacked ceramic dielectric layers; a plurality of internal electrodes opposed to each other with the ceramic dielectric layers interposed therebetween; and an external electrode provided on an outer surface of the ceramic laminated body and electrically connected to the internal electrodes, wherein the internal electrodes contain Ni as a main constituent, and contain Sn; and the Ni constituting the internal electrodes has a lattice constant in a range of 0.3250 nm to 0.3450 nm,
the method comprising the steps of:
forming an unfired ceramic laminated body comprising a plurality of stacked, unfired ceramic dielectric layers, the unfired ceramic dielectric layers comprising a ceramic raw material containing Sn, and a plurality of unfired internal electrode patterns opposed to each other with the unfired ceramic dielectric layers interposed therebetween, the unfired internal electrode patterns comprising a conductive paste film containing Ni as a main constituent; and
firing the unfired ceramic laminated body to obtain a ceramic laminated body including a plurality of ceramic dielectric layers, and a plurality of internal electrodes opposed to each other with the ceramic dielectric layers interposed therebetween.

14. A method for manufacturing a laminated ceramic capacitor comprising: a ceramic laminated body of a plurality of stacked ceramic dielectric layers; a plurality of internal electrodes opposed to each other with the ceramic dielectric layers interposed therebetween; and an external electrode provided on an outer surface of the ceramic laminated body and electrically connected to the internal electrodes, wherein the internal electrodes contain Ni as a main constituent, and contain Sn; and the Ni constituting the internal electrodes has a lattice constant in the range of 0.3250 nm to 0.3450 nm,
the method comprising the steps of:
forming an unfired ceramic laminated body comprising a plurality of stacked, unfired ceramic dielectric layers, and a plurality of unfired internal electrode patterns opposed to each other with the unfired ceramic dielectric layers interposed therebetween, the unfired internal electrode patterns comprising a conductive paste film containing Ni as a main constituent and containing Sn; and
firing the unfired ceramic laminated body to obtain a ceramic laminated body including a plurality of ceramic dielectric layers, and a plurality of internal electrodes opposed to each other with the ceramic dielectric layers interposed therebetween.

* * * * *